US010582345B1

(12) United States Patent
Lim et al.

(10) Patent No.: US 10,582,345 B1
(45) Date of Patent: Mar. 3, 2020

(54) PUSH TO TALK APPLICATIONS

(71) Applicant: MOTOROLA SOLUTIONS, INC, Chicago, IL (US)

(72) Inventors: Bing Qin Lim, Jelutong (MY); Anoop Sehgal, Ipoh (MY); Sakri Ahmad, Butterworth (MY); Swee Yee Soo, Gelugor (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/248,938

(22) Filed: Jan. 16, 2019

(51) Int. Cl.
*H04W 4/10* (2009.01)
*H04W 4/08* (2009.01)

(52) U.S. Cl.
CPC ............... *H04W 4/10* (2013.01); *H04W 4/08* (2013.01)

(58) Field of Classification Search
CPC ......... H04W 4/10; H04W 4/08; H04W 52/02; H04W 52/07; H04W 52/0229; H04L 5/16
See application file for complete search history.

(56) References Cited

U.S. PATENT DOCUMENTS

| 7,529,540 | B2 | 5/2009 | Cox et al. |
| 8,700,008 | B2 | 4/2014 | Reddy et al. |
| 8,880,047 | B2 | 11/2014 | Konicek et al. |
| 2005/0143135 | A1* | 6/2005 | Brems ............... H04M 1/2745 455/564 |
| 2009/0284348 | A1* | 11/2009 | Pfeffer ............... G08B 25/006 340/7.3 |
| 2014/0082567 | A1* | 3/2014 | Martyn ............... G06F 3/0482 715/841 |
| 2016/0309413 | A1* | 10/2016 | De Sabatino ..... H04W 52/0229 |
| 2017/0277758 | A1* | 9/2017 | Ishii ...................... H04L 67/02 |
| 2018/0248996 | A1* | 8/2018 | Johnson ............ H04M 1/72522 |

* cited by examiner

Primary Examiner — Wesley L Kim
Assistant Examiner — Dong-Chang Shiue

(57) ABSTRACT

A method and apparatus for inputting voice into an application is provided herein. During operation a "channel-change" knob (sometimes referred to as a selector knob) on a radio will be utilized to cycle between talkgroups/channels for over-the-air voice transmission. Additionally, the channel-change knob on the radio will be used to cycle between applications stored on the radio. A push-to-talk button on the radio will serve as a trigger to collect voice input for a selected talkgroup for over-the-air transmission when a talkgroup is selected, and will also serve as a trigger to collect voice input for an application when the application is selected.

11 Claims, 4 Drawing Sheets

PUSH TO TALK APPLICATIONS

BACKGROUND OF THE INVENTION

Many of today's electronic devices include multiple applications that may be accessed by the user of the device. Applications comprise a program or piece of software designed and written to fulfill a particular purpose. Some applications include, but are not limited to, email applications, texting applications, calendar applications, navigation applications, camera applications, timeline applications, . . . , etc.

Many applications have a voice-input feature, where the user may speak into a microphone, and have their speech act as an input to the application. For example, a user who wishes to navigate to a particular address, may run a navigation application, and speak the address instead of inputting the address via, for example, a keyboard.

Push-to-talk (PTT) devices are commonly employed by public safety personnel, air traffic controllers, emergency workers, construction site workers and others who need to be in constant and readily available voice communication. PTT, also known as press-to-transmit, is a method of communicating using half-duplex communication lines. A PTT button may be pressed to switch a device from a voice reception mode to a transmit-mode. For example, when a channel/talkgroup is selected, one operator may depress the PTT button on her device and speak into the device's microphone. The speech is converted into an appropriate format and transmitted to one or more other devices over the channel/talkgroup, where the operators of those other devices hear the first operator speak through their device's speaker.

When communicating over a talkgroup/channel, each PTT radio typically communicates with one group of radios (talkgroup) at a time. Even though a radio may switch between talkgroups, the radio may still only be able to communicate with a single talkgroup at a time. For example, a firefighter may be affiliated with or using a firefighter talkgroup and a police officer may be affiliated with or using a police talkgroup. Talkgroups outside of those currently listened to by a radio will not be heard by other radios or consoles. Thus, a radio speaker will only output audio from a talkgroup associated with the radio, and the radio's transmission will only be heard by those communicating on a same talkgroup.

Instead of assigning, for example, a radio channel to one particular organization (group) at a time, users are instead assigned to a logical grouping, a "talkgroup". When any user in that group wishes to converse with another user in the talkgroup, a vacant radio channel is found automatically by the system and the conversation takes place on that channel. Many unrelated conversations can occur on a channel, making use of the otherwise idle time between conversations. A control channel coordinates all the activity of the radios in the system. The control channel sends packets of data to enable one talkgroup to talk together, regardless of frequency.

Because PTT and talkgroups are so ubiquitous in the public-safety realm, it would be beneficial if a PTT button and a talkgroup selector could be used to control voice input into applications that reside on device. This would serve to decrease an amount of time it takes for information to be input into an application, which can greatly benefit the public-safety officer.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
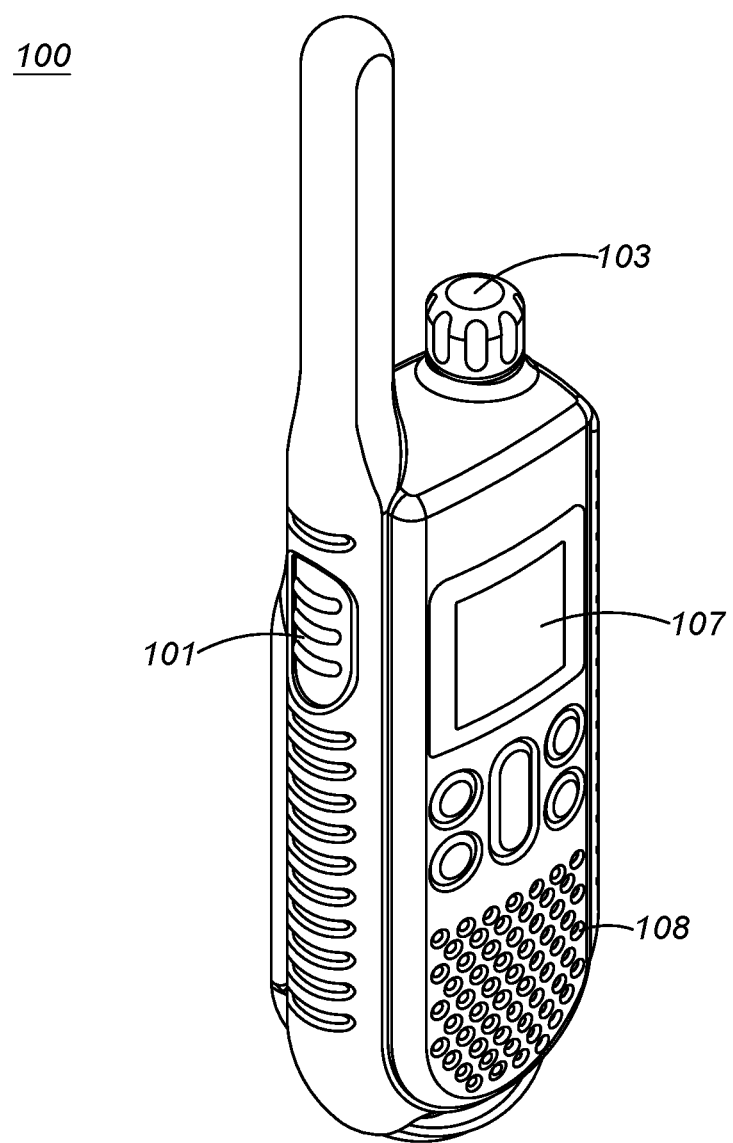
FIG. 1 illustrates push-to-talk (PTT) radio.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to reduce a time necessary to input voice into an application, a method and apparatus for inputting voice into an application is provided herein. During operation a "channel-change" knob (sometimes referred to as a selector knob) on a radio will be utilized to cycle between talkgroups/channels for over-the-air voice transmission. Additionally, the channel-change knob on the radio will be used to cycle between applications stored on the radio. A push-to-talk button on the radio will serve as a trigger to collect voice input for a selected talkgroup for over-the-air transmission when a talkgroup is selected, and will also serve as a trigger to collect voice for input to an application when the application is selected.

Considering the above, when a public-safety officer switches to a particular application using the selector knob, then presses the push-to-talk (PTT) button, the content of the voice may be converted to text and loaded locally (by the radio) into the particular mobile application that was selected with the selector knob. In an alternate embodiment of the present invention, when a user presses the push-to-talk (PTT) button, the voice may be recorded and stored locally. The recorded voice can then be loaded locally (by the radio) into the particular mobile application that was selected with the selector knob. In any of the above embodiments, if the application is not currently running, the application will be launched prior to the voice being input into the application. For example:

When user rotates the selector knob to highlight a Whatsapp™ application, presses the PTT button, and speaks into the microphone, the Whatsapp application will be launched, the voice will be converted to text, and the text will be sent as a WhatsApp application.

When a user rotates the selector knob to highlight a timeline application, presses the PTT button, and speaks into the microphone, the voice will be converted to text and input into the timeline application.

When a user rotates the selector knob to highlight a digital assistant application, presses the PTT button, and speaks into the microphone, the voice will be recorded and stored. The stored voice will be input into the digital assistant application.

When a user rotates the selector knob to highlight a talkgroup, presses the PTT button, the voice will not be converted to text, but simply transmitted over-the-air on the talkgroup.

As is evident, the selector knob on the radio is used for both selecting an application and selecting a channel or a talkgroup (as discussed, a talkgroup is an assigned group of radios on a trunked radio system). When either an application or talkgroup is "selected", the application or talkgroup name will be displayed "highlighted'. Highlighting an application or talkgroup name may comprise displaying the font in bold, italics, in a particular color, surrounded by an outline (e.g., a box), or any other form of displaying the application or talkgroup name in a different manner than the non-highlighted applications or talkgroups.

In addition, the PTT button on the radio is used for both selecting a voice input for an application and transmitting the voice-input over the air on the channel or talkgroup. The decision on whether or not to use the voice as an input to an application, or to send the voice over-the-air depends on whether or not a channel/talkgroup is selected, or an application is selected using the selector knob.

FIG. 1 illustrates push-to-talk (PTT) radio 100. As shown, radio 100 comprises PTT button 101, knob 103, display/screen 107, and speaker/microphone 108. PTT button 101 comprises a standard button that may be mechanical or virtual (touchscreen user interface button). When a talkgroup or channel is selected via knob 103 and PTT button 101 is pressed, radio 100 transitions from a listening state, to a transmit state, transmitting received voice over the selected talkgroup (herein the term "talkgroup" will be meant to comprise both a talkgroup and/or a physical channel). When an application is selected via knob 103 and PTT button 101 is pressed, radio 100 transitions from a listening state to a "voice collecting" state and inputs the collected voice into the selected application. As mentioned above, the voice may be converted to text prior to being input into the selected application.

Display 107 comprises a way of conveying (e.g., displaying) a list of applications and talkgroups as well as the knob-selection information to the user. Display 107 may simply comprise a liquid-crystal display (LCD), or may comprise additional types of displays (e.g., a light-emitting diode (LED) display). Display 107 may also comprise a touch-screen display that provides both an output interface and an input interface between the device and a user. Display 107 may also provide graphics, video, and any combination thereof.

Microphone 108 comprises a standard microphone 108 for converting sound waves to electrical signals for text-to-speech conversion, transmission over a talkgroup, recording, and/or input into an application.

Knob 103 includes an internal sensor (not shown) as known in the art to provide position and direction information to logic circuitry 403 to communicate knob position for selection of menu items. Since the knob is preferably a continuous rotational device having an infinite range of rotational motion, an encoder, rather than continuous turn potentiometer, is a suitable sensor due to the encoder's accuracy and lower errors when transitioning between maximum and minimum values. Other types of sensors can, of course, be used in other embodiments, including magnetic sensors, analog potentiometers, etc. Knob 103 is configured such that rotation of knob 103 serves to "walk" down a list of applications and talkgroups, switching between talkgroups and applications as the knob rotates. Knob 103 is approximately a cylindrical object. Knob 103 can alternatively be implemented as a variety of different objects, including conical shapes, spherical shapes, dials, cubical shapes, rods, etc., and may have a variety of different textures on their surfaces, including bumps, lines, or other grips, or projections or members extending from the circumferential surface.

A user preferably grips or contacts the circumferential surface of knob 103 and rotates it a desired amount to scroll through menu items (the menu items comprise listed talkgroups and applications). A selected menu item is highlighted. Once knob 103 is rotated to highlight a particular talkgroup/application, any activation (pushing) of the PTT button 101 will cause radio 100 to function as described above.

Figure 2:
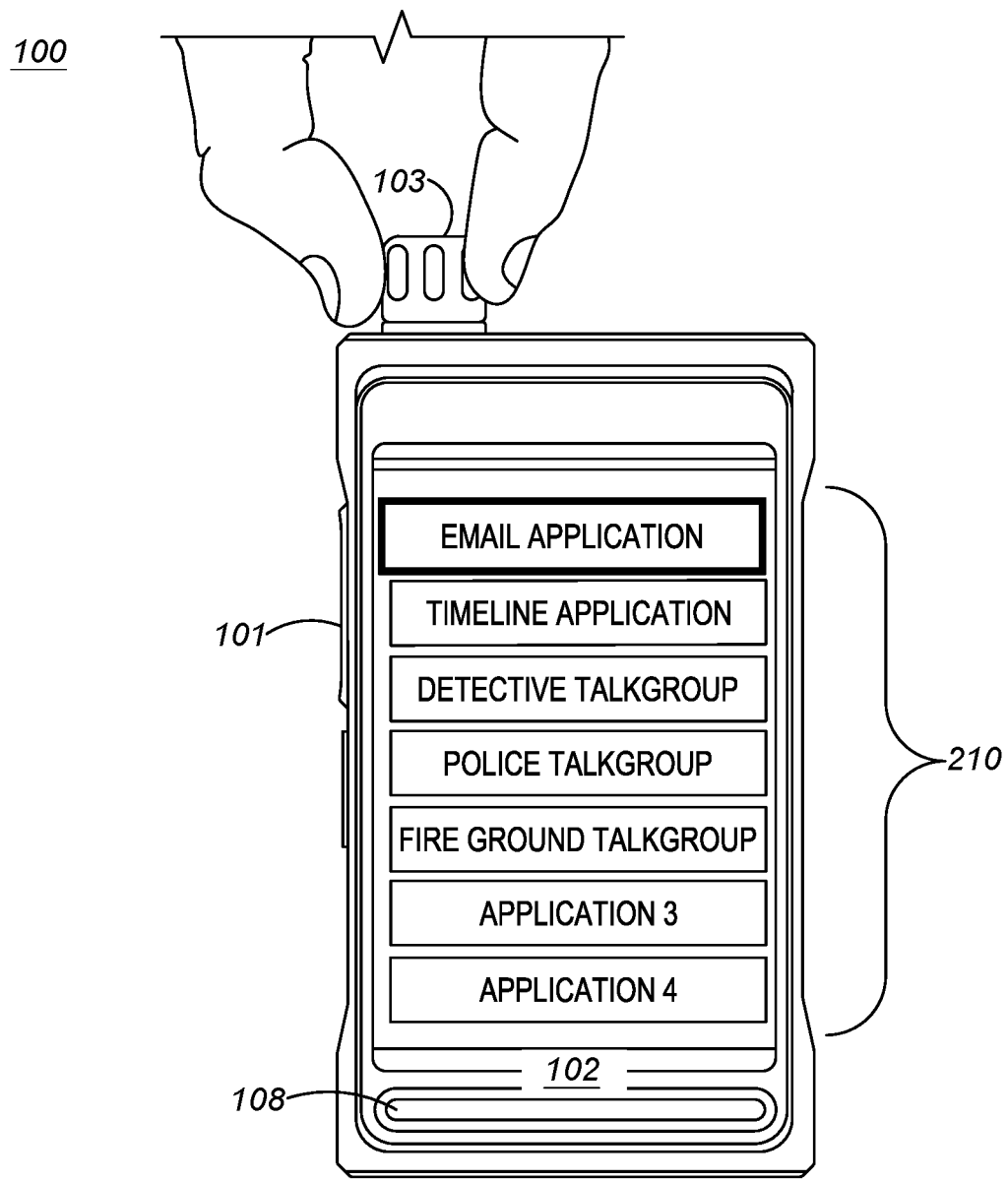
FIG. 2 illustrates PTT radio with a menu of talkgroups and applications.

It should be noted that display 102 will preferably display both the names of the talkgroups and particular applications in a list. For example, as shown in FIG. 2, the Police Talkgroup, Detective Talkgroup, and the Fire Ground talkgroup may be displayed in a list 210, so when one of the talkgroups is highlighted, communications to other police officers, or firemen take place over the talkgroup upon the pushing of the PTT button 101. However, as also shown, applications may also be displayed in list 210, such as an email application, a timeline application, application 3, application 4, . . . , etc. Other examples of applications are Whatsapp™ application (text messaging application), photo gallery application, calculator application, maps navigation application, calendar application, status update application, job ticket update application, task checklist application, camera application, citation application etc. When an application is highlighted/selected, activation of the PTT button will cause the received voice to be input into the highlighted application. In FIG. 2, the highlighted and selected item (surrounded with a box) from list 210 comprises the email application. Thus in this example where email application is selected, when user press the PTT button and speak, email application will be launched automatically, the user's voice will be transcripted to text and inserted into the email composer and then sent out to a predetermined email address. Thus the application name can be preconfigured to be associated with specific email address. The application name can also be more specifically shown with detail configuration (for example, "Email—Patrolling Team", "Email—Manager", "Email—Smith").

Other examples how a user's voice can be inserted into selected application follow:

If user selects a timeline application, pushes a PTT button and speaks "Found blue bag in suspect car", the user's voice will be converted into text, timestamped and inserted into timeline application.

If a police officer selects a camera application, pushes a PTT button and speaks "blue shirt yellow pant male" for example, user's voice will be converted into text, processed with natural language processing, and inserted to camera application to instruct camera to look for the person with male gender who is wearing a blue shirt and yellow pants.

If a paramedic selects map navigation application, presses PTT button and states "Queensbay Hospital", the voice will be converted to text and use the text "Queensbay Hospital" as search term to initiate navigation route instruction to Queensbay Hospital.

List 210 preferably (but not necessarily) comprises a single list 210 having multiple lines. Each line comprises a name of a talkgroup or application. A single talkgroup name or application name exists per line. More particularly, list 210 preferably comprises a first line having a first talkgroup name, a second line having a first application name, a third line having a second talkgroup name, and a fourth line having a second application name.

In one embodiment, the talkgroup and application name list can be listed or grouped near to each other based on relevancy of the application to the talkgroup, for example, "Citation App" application name can be listed right after "Patrolling Talkgroup" talkgroup name as citation app are frequently used during patrolling jobs. The "Camera App" application name can be listed right after "Suspect Pursuit Talkgroup" talkgroup name as normally camera is needed during suspect pursuit to identify person of interest (suspect).

The relevancy of the talkgroup and application can be learned through logging user usage habits and frequency of using certain applications while in the middle of communicating in certain talkgroups. For example, if a camera application is always triggered through the PTT button immediately following or preceding a PTT to "Suspect Pursuit Talkgroup" the talkgroup and application may lie near each other on the list.

Figure 3:
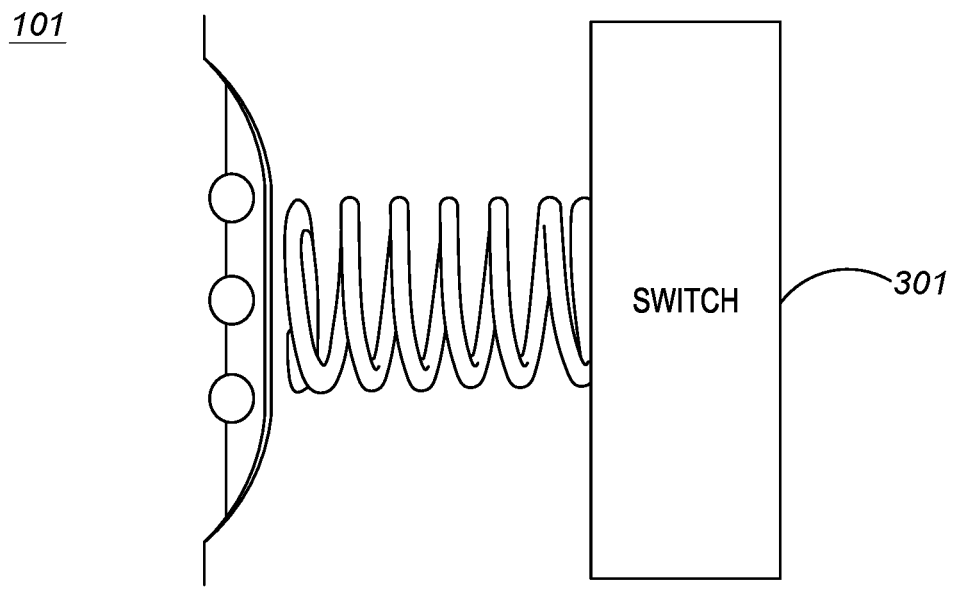
FIG. 3 illustrates a PTT button.

FIG. 3 is a cutaway view of PTT button 101. In this particular example, PTT button 101 also comprises a spring-actuated switch so that the physical depressing (pressing) of button 101 causes radio 100 to activate a half-duplex transmitter or collect voice for input into an application. During operation, switch 310 provides a PTT signal to logic circuitry in order to indicate that the PTT button has been pressed.

Figure 4:
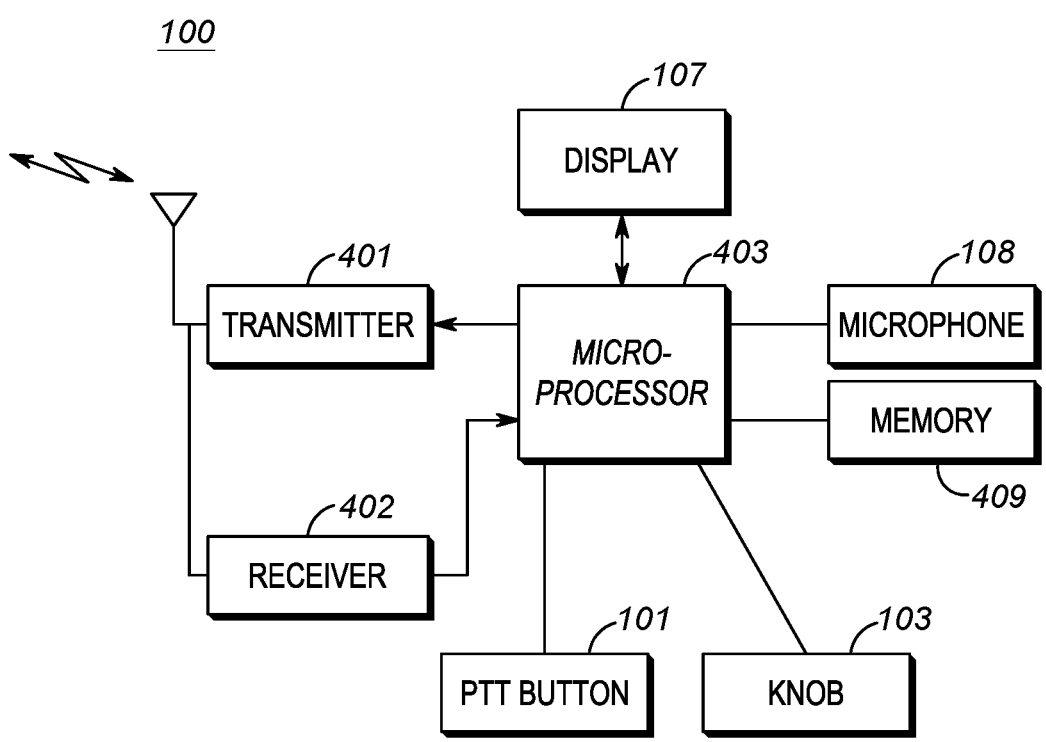
FIG. 4 depicts PTT radio that incorporates a PTT-to-Application function.

FIG. 4 is a block diagram of the radio of FIG. 1. As shown, radio 100 may include transmitter 401, receiver 402, display 107, logic circuitry (processor) 403, memory 409, knob 103, microphone 108, and PTT button 101. In other implementations, radio 100 may include more, fewer, or different components.

Transmitter 401 and receiver 402 may be well known long-range and/or short-range transceivers that utilize a private 802.11 network set up by a building operator, a next-generation cellular communications network operated by a cellular service provider, or any public-safety network such as an APCO 25 network or the FirstNet broadband network. Transmitter 401 and receiver 402 may also contain multiple transmitters and receivers, to support multiple communications protocols simultaneously.

Logic circuitry 403 comprises a digital signal processor (DSP), general purpose microprocessor, a programmable logic device, an Application Processor, or application specific integrated circuit (ASIC) and is utilized to control information displayed on display 107, and route any voice input accordingly.

As discussed above, display 107 is configured to display a both applications and talkgroups in a list 210, with only one application or talkgroup highlighted.

During operation, logic circuitry 403 receives a rotation input from knob 103. More particularly, a rotation of knob 103 causes logic circuitry 403 to highlight a particular application or talkgroup displayed on display 107 (as shown in FIG. 2). Continued rotation of knob 103 causes logic circuitry to cycle through highlighting list 210 items. Logic circuitry 403 also receives an input from PTT button 101.

When switch 301 has been activated by pressing button 101, logic circuitry 403 will cause transmitter 401 to transmit voice received from a microphone 108 over the air on a highlighted talkgroup only if display 107 is highlighting a talkgroup (i.e., if a talkgroup is "selected").

When PTT button 101 has been pressed, logic circuitry 403 will launch an application from memory 409 and input voice received from microphone 108 into the application only if display 107 is highlighting the application (i.e., if the application is "selected"). It should be noted that the voice received from microphone 108 may temporarily be stored in memory 409 prior to providing the voice to any application. Alternatively, the voice received from microphone 108 may be converted to text, and the text may be provided to the application.

As is evident, the apparatus in FIG. 4 comprises an over-the-air transmitter 401 configured to transmit voice over a talkgroup, memory 409 storing applications, and a display 107 configured to display a list 210. As discussed, list 210 comprises names of both talkgroups and applications and has one name from the talkgroup and application names selected and highlighted.

A knob 103 is provided that is configured to rotate. A rotation of the knob causes the one name selected and highlighted to change.

Both a microphone 108 configured to receive voice, and a PTT button 101 are provided, with logic circuitry 403 configured to determine that the PTT button was pressed, determine the name selected from list 210, and perform one of routing the voice to the over-the-air transmitter 401 when a talkgroup name is selected, or routing the voice to an application when the application name is selected.

Each of the above elements 401, 409, 107, 210, 103, 101, 108, and 403 are integrated to improve the functioning of a radio 100 so that radio 100 now allows a user to utilize PTT button 101 and a talkgroup selector 103 to be used to control voice input into applications that reside on device. This serves to decrease an amount of time it takes for information to be input into an application, which can greatly benefit the public-safety officer.

As discussed above, the logic circuitry 403 may route the voice to the application by storing the voice in the memory 409 (possibly as text), launching the application from the memory 409, and providing the stored voice/text to the application. In an alternate embodiment, the logic circuitry may route the voice to the application by converting the voice to text, and directly providing the text to the application.

As shown in FIG. 2, list 210 preferably (but not necessarily) comprises a single list 210 having multiple lines of the names of talkgroups and the names of applications, with a single talkgroup name or application name existing per line. More particularly, list 210 preferably comprises a first line having a first talkgroup name, a second line having a first application name, a third line having a second talkgroup name, and a fourth line having a second application name. As mentioned earlier, the talkgroup name and application name can also be grouped based on relevancy of one talkgroup to the application (for example, a relevant application name is listed next to certain talkgroup name).

Figure 5:
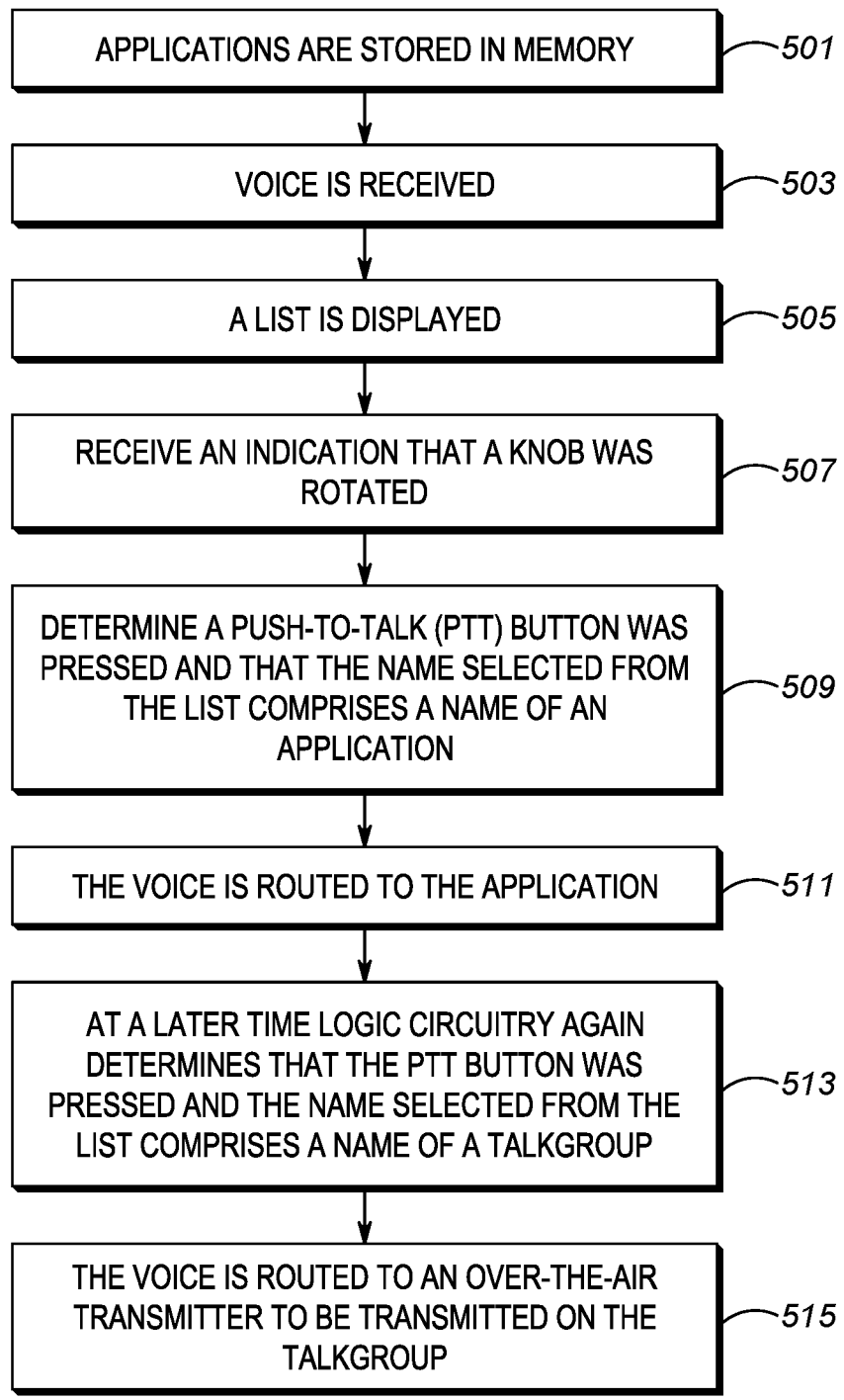
FIG. 5 is a flow chart showing operation of the radio of FIG. 4.

FIG. 5 is a flowchart showing operation of the device of FIG. 1. The logic flow begins at step 501 where applications are stored in memory 409. Voice is received at microphone 108 and provided to logic circuitry 403 at step 503. At step 505 a list 210 is displayed. As shown in FIG. 2, the list comprises names of both talkgroups and applications, and has one name from the talkgroup and application names selected and highlighted.

The logic flow continues to step 507 where logic circuitry 403 receives an indication that a knob was rotated. This preferably comprises knob 103 providing the position and direction information to logic circuitry 403 As discussed, a rotation of the knob causes the one name selected and highlighted to change.

At step 509, logic circuitry 403 determines a push-to-talk (PTT) button was pressed and that the name selected from the list comprises a name of an application. In response, the voice is routed to the application (step 511).

At a later time (step 513) logic circuitry 403 again determines that the PTT button was pressed (from a signal received from switch 301) and the name selected from the list comprises a name of a talkgroup. In response, the voice is routed to an over-the-air transmitter to be transmitted on the talkgroup (step 515).

As discussed above, the voice may be routed to the application by storing the voice in memory, launching the application from the memory, and providing the stored voice to the application. The voice may be routed to the application by logic circuitry 403 converting the voice to text, and providing the text to the application. The text may or may not be stored in memory prior to providing the text to an application.

Each of the above steps in FIG. 5 are integrated to improve the functioning of radio 100 in that the above steps allow a user to utilize PTT button 101 and a talkgroup selector 103 to control voice input into applications that reside on radio 100. This serves to decrease an amount of time it takes for information to be input into an application, which can greatly benefit the public-safety officer.

As is evident, a single selector knob is used to select among both applications and talkgroups. A single PTT button is used to access both applications and talkgroups. A single list is provided comprising both applications and talkgroups.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
an over-the-air transmitter configured to transmit voice over a talkgroup;
memory storing applications;
a display configured to display both talkgroups and applications, and having one name from the talkgroup and application names selected and highlighted;
a knob configured to rotate, a rotation of the knob configured to cause the one name selected and highlighted to change;
a microphone configured to receive voice;
a push-to-talk (PTT) button;
logic circuitry configured to:
determine that the PTT button was pressed;
determine the name selected comprises a name of a talkgroup;
route the voice to the over-the-air transmitter when the name selected comprises the name of the talkgroup;
determine the name selected comprises a name of an application, wherein the application comprises an email application, a texting application, a calendar application, a navigation application, a camera application, a digital assistant application, photo gallery application, a calculator application, a status update application, a job ticket update application, a task checklist application, a citation application, or a timeline application;
route the voice to an application when the name selected comprises a name of the email application, the texting application, the calendar application, the navigation application, the camera application, the digital assistant application, the photo gallery application, the calculator application, the status update application, the job ticket update application, the task checklist application, the citation application, or the timeline application.

2. The apparatus of claim 1 wherein the logic circuitry routes the voice to the application by storing the voice in the memory, launching the application from the memory, and providing the stored voice to the application.

3. The apparatus of claim 1 wherein the logic circuitry routes the voice to the application by converting the voice to text, and providing the text to the application.

4. The apparatus of claim 1 wherein the display is configured to display talkgroups and applications in a a single list having multiple lines of the names of talkgroups and the names of applications, with a single talkgroup name or application name existing per line.

5. The apparatus of claim 1 wherein the display is configured to display talkgroups and applications in a list that comprises a first line having a first talkgroup name, a second line having a first application name, a third line having a second talkgroup name, and a fourth line having a second application name, wherein the first and the second application names comprise names for applications, the applications taken from the group consisting of an email application, a texting application, a calendar application, a navigation application, a camera application, a digital assistant application, photo gallery application, a calculator application, a status update application, a job ticket update application, a task checklist application, a citation application, and a timeline application.

6. The apparatus of claim 5, wherein the first line comprises an application or talkgroup that is used most frequently.

7. A method comprising the steps of:
storing applications in memory;
receiving voice;
displaying names of both talkgroups and applications, with one name from the talkgroup and application names selected and highlighted;
receiving an indication that a knob was rotated, wherein a rotation of the knob causes the one name selected and highlighted to change;
determining that a push-to-talk (PTT) button was pressed;
determining that the name selected comprises a name of an application and in response, routing the voice to the application in response, wherein the application comprises an email application, a texting application, a calendar application, a navigation application, a camera application, a digital assistant application, photo gallery application, a calculator application, a status update application, a job ticket update application, a task checklist application, a citation application, or a timeline application;
at a later time, again determining that the PTT button was pressed; and
determining the name selected comprises a name of a talkgroup and in response, routing the voice to an over-the-air transmitter to be transmitted on the talkgroup.

8. The method of claim 7 wherein the voice is routed to the application by storing the voice in memory, launching the application from the memory, and providing the stored voice to the application.

9. The method of claim 7 wherein the voice is routed to the application by converting the voice to text, and providing the text to the application.

10. The method of claim 7 wherein the talkgroups and applications are displayed in a single list having multiple lines of the names of talkgroups and the names of applications, with a single talkgroup name or application name existing per line.

11. The method of claim 7 wherein the list comprises a first line having a first talkgroup name, a second line having a first application name, a third line having a second talkgroup name, and a fourth line having a second application name, wherein the first and the second application names comprise names for applications, the applications taken from the group consisting of an email application, a texting application, a calendar application, a navigation application, a camera application, a digital assistant application, photo gallery application, a calculator application, a status update application, a job ticket update application, a task checklist application, a citation application, and a timeline application.

* * * * *